US011901685B2

(12) United States Patent
Hu et al.

(10) Patent No.: US 11,901,685 B2
(45) Date of Patent: Feb. 13, 2024

(54) ROTATABLE ELECTRICAL PLUG

(71) Applicant: Deals Realm LLC, Eastvale, CA (US)

(72) Inventors: Yuangui Hu, Zhongshan (CN); Yuebo Tao, Eastvale, CA (US)

(73) Assignee: Deals Realm LLC

( * ) Notice: Subject to any disclaimer, the term of this patent is extended or adjusted under 35 U.S.C. 154(b) by 0 days.

(21) Appl. No.: 18/139,188

(22) Filed: Apr. 25, 2023

(65) Prior Publication Data

US 2023/0344183 A1 Oct. 26, 2023

(30) Foreign Application Priority Data

Apr. 25, 2022 (CN) ......................... 202220962452.8

(51) Int. Cl.
*H01R 39/64* (2006.01)

(52) U.S. Cl.
CPC .................................... *H01R 39/64* (2013.01)

(58) Field of Classification Search
CPC ................................ H01R 39/64; H01R 39/00
See application file for complete search history.

(56) References Cited

U.S. PATENT DOCUMENTS 7,063,558 B1 * 6/2006 Chen .................. H01R 13/6335 439/484
7,914,292 B2 * 3/2011 Honda .................. H01R 24/66 439/21
7,946,852 B2 * 5/2011 John ...................... H01R 35/04 439/21
8,123,528 B2 * 2/2012 Devlin .................. H01R 35/04 439/21

* cited by examiner

*Primary Examiner* — Travis S Chambers
(74) *Attorney, Agent, or Firm* — ScienBiziP, P.C.

(57) ABSTRACT

The present disclosure provides a rotatable electrical plug including a non-rotating assembly configured for receiving and being coupled with power lines of the rotatable electrical plug, the non-rotating assembly comprising a substrate, a first ring-shaped conductor and a second ring-shaped conductor; a rotating assembly being rotatable 360 degrees relative to the non-rotating assembly, the rotating assembly comprising at least two electrode terminals; a first rotating conductor and a second rotating conductor connected to the first ring-shaped conductor and the second ring-shaped conductor respectively, at least one of the first rotating conductor and the second rotating conductor comprising a base and two arms extending from the base and extending in two non-parallel directions, each of the two arms including a contacting portion having a contacting surface, the contacting surfaces of the two arms contact two different positions of a same ring-shaped conductor of the first and the second ring-shaped conductors.

14 Claims, 13 Drawing Sheets

ROTATABLE ELECTRICAL PLUG

RELATED APPLICATIONS

This application claims the benefit of priority to Chinese Patent Application Number 202220962452.8 filed on Apr. 25, 2022, in the China National Intellectual Property Administration. The entire contents of the above-identified application are hereby incorporated by reference.

TECHNICAL FIELD

The disclosure relates to the technical field of plugs, and in particular to a rotatable electrical plug.

BACKGROUND

Generally, most of electrical apparatus need to use a power plug to connect to electrical power, and the power plugs are fixedly connected with its power cord. Because the insertion holes of the socket each has a specified direction, when the space between the power plug and the socket fixed on the wall or floor is small, the power cord is prone to become twisted relative to the power plug, and it is not convenient to plug the power plug into the socket. In particularly some electrical apparatuses, such as vacuum cleaners, hair dryers, power tools, etc., the electrical apparatuses change positions during use, and the traditional power plugs, especially for connection portions of the power cords adjacent to the plugs have to withstand torsions in different directions, which may cause damages or breakages of the power cords, and therefore the power cords may be safety hazards to the electrical apparatuses. Some power plugs can rotate, but these power plugs usually have complex structures and cost more. Furthermore, such power plugs can only rotate at a certain angle and cannot achieve 360 degrees rotations, which is also a main drawback of traditional power plugs.

Therefore, there is a room for improvement in the art.

SUMMARY OF INVENTION

According to one aspect of the present disclosure, an exemplary embodiment of provides a rotatable electrical plug including a non-rotating assembly configured for receiving and being coupled with power lines of the rotatable electrical plug, the non-rotating assembly comprising a substrate, a first ring-shaped conductor and a second ring-shaped conductor spaced from the first ring-shaped conductor, wherein the first ring-shaped conductor and the second ring-shaped conductor are located in concentric circles; and a rotating assembly being rotatable 360 degrees relative to the non-rotating assembly, the rotating assembly comprising at least two electrode terminals configured to electrically plug-in a power socket; a first rotating conductor and a second rotating conductor connected to the first ring-shaped conductor and the second ring-shaped conductor respectively, at least one of the first rotating conductor and the second rotating conductor comprising a base and two arms extending from the base and extending in two non-parallel directions, each of the two arms including a contacting portion having a contacting surface, wherein the contacting surfaces of the two arms contact two different positions of a same ring-shaped conductor of the first and the second ring-shaped conductors, each of the at least two electrode terminals is connected to a corresponding one of the first and the second ring-shaped conductors via a corresponding one of the first and the second rotating conductors.

In the present disclosure, each of the contacting surfaces is a flat surface.

In the present disclosure, an area of the contacting surface is 2-5 square millimeters.

In the present disclosure, each of the two arms further comprises an extending portion adjacent to a free end of each of the two arms, the extending portion connects to the contacting portion and does not contact the corresponding one of the first and the second ring-shaped conductors.

In the present disclosure, each of the two arms further comprises a connecting portion obliquely connecting the base and the contacting portion, so that the base and the contacting portion are located on different planar surfaces.

In the present disclosure, the first rotating conductor and the second rotating conductor each comprises the base and the two arms, the two arms and at least part of the base of the first rotating conductor form a first arc-like structure, the two arms and at least part of the base of the second rotating conductor form a second arc-like structure, the second arc-like structure is closer to a center of the rotatable electrical plug compared to the first arc-like structure.

In the present disclosure, the base of the first rotating conductor and the base of the second rotating conductor are coplanar.

In the present disclosure, the rotating assembly further comprises a plate, the plate comprises a first surface exposed to an exterior of the rotatable electrical plug and a second surface disposed opposite to the first surface, one end of each of the at least two electrode terminals extends through the plate, and exposes to the exterior from the second surface of the plate, and then couples to the corresponding one of the first rotating conductor and the second rotating conductor.

In the present disclosure, the plate comprises at least one aperture corresponding to the at least one of the electrode terminals, and a protrusion located on the second surface is applied to surround the corresponding aperture, the corresponding electrode terminal extends through the plate via the corresponding aperture and one of the first rotating conductor and the second rotating conductor connected to the corresponding electrode terminal is arranged above the protrusion.

In the present disclosure, the rotating assembly further comprises a fastening element mounted on the plate, the fastening element comprises notches corresponding to the arms and a spacer formed between two adjacent notches arranged in a circumferential direction, the arms expose to the exterior via the corresponding notch, and the spacer is disposed to sandwich the base with the protrusion.

In the present disclosure, a height between the contacting portion and the second surface of the plate is greater than a thickness of the fastening element.

In the present disclosure, the first rotating conductor and the second rotating conductor each is a metal component with elasticity.

In the present disclosure, the non-rotating assembly further comprises a non-rotating conductor located at a center of the substrate, the rotating assembly comprises a third rotating conductor, the non-rotating conductor is electrically connected to the corresponding electrode terminal via the third rotating conductor.

In the present disclosure, the non-rotating conductor comprises a sheet and a fixing portion integrated with the sheet, the sheet obliquely connects to the fixing portion.

In the present disclosure, each of the first and the second rotating conductors further comprises a mounting portion configured to connect to the corresponding one of the first and the second electrode terminals.

According to one aspect of the present disclosure, another exemplary embodiment of provides a rotatable electrical plug including a non-rotating assembly configured for receiving and being coupled with power lines of the rotatable electrical plug, the non-rotating assembly comprising a substrate, and at least one non-rotating element; and a rotating assembly being rotatable relative to the non-rotating assembly, the rotating assembly comprising at least two electrode terminals configured to electrically plug-in a power socket; and at least one rotating conductor connected to the at least one non-rotating element respectively, at least one rotating conductor comprising a base and two arms obliquely extending from the base and extending in two non-parallel directions, wherein at least one electrode terminal is connected to the at least one ring-shaped conductor via the at least one rotating conductor.

According to one aspect of the present disclosure, another exemplary embodiment of provides a rotatable electrical plug including a non-rotating assembly configured for receiving and being coupled with power lines of the rotatable electrical plug, the non-rotating assembly comprising a substrate, and a non-rotating conductor located at the substrate, the non-rotating conductor comprises a sheet and a fixing portion integrated with the sheet, the sheet is obliquely connecting the fixing portion; and a rotating assembly being rotatable relative to the non-rotating assembly, the rotating assembly comprising at least two electrode terminals configured to electrically plug-in a power socket; and at least two rotating conductors connected to the corresponding one of the at least two electrode terminals, one of the at least two electrode terminals is connected to the non-rotating conductor via a corresponding one of the at least two rotating conductors.

BRIEF DESCRIPTION OF DRAWINGS

Implementations of the present disclosure will now be described, by way of embodiment, with reference to the attached figures.

DETAILED DESCRIPTION

Figure 1:
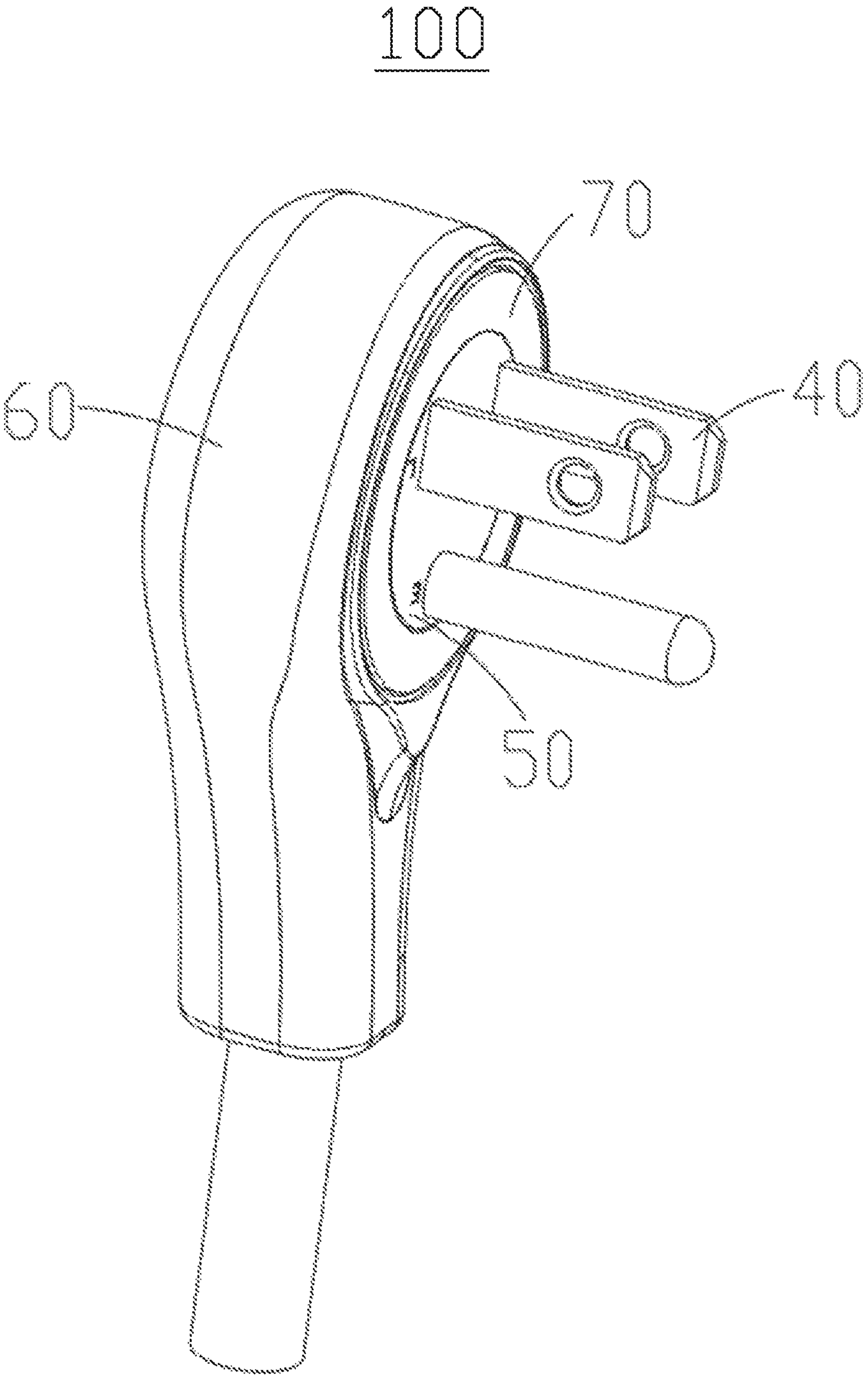
FIG. 1 is a schematic diagram of a first embodiment of a three-dimensional structure of a rotatable electrical plug according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”, specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references may mean “at least one”.

First Embodiment

A rotatable electrical plug 100 according to a first embodiment of the present disclosure will be described below with reference to FIGS. 1 to 9.

Referring to FIGS. 1 to 9, the present disclosure provides the rotatable electrical plug 100, the rotatable electrical plug 100 comprises a non-rotating assembly 101, a rotating assembly 102, a housing 60 and a frame 70. The non-rotating assembly 101, the rotating assembly 102, and the frame 70 are received in the housing 60, and the rotating assembly 102 is rotatable 360 degrees relative to the non-rotating assembly 101 and the housing 60.

Figure 2:
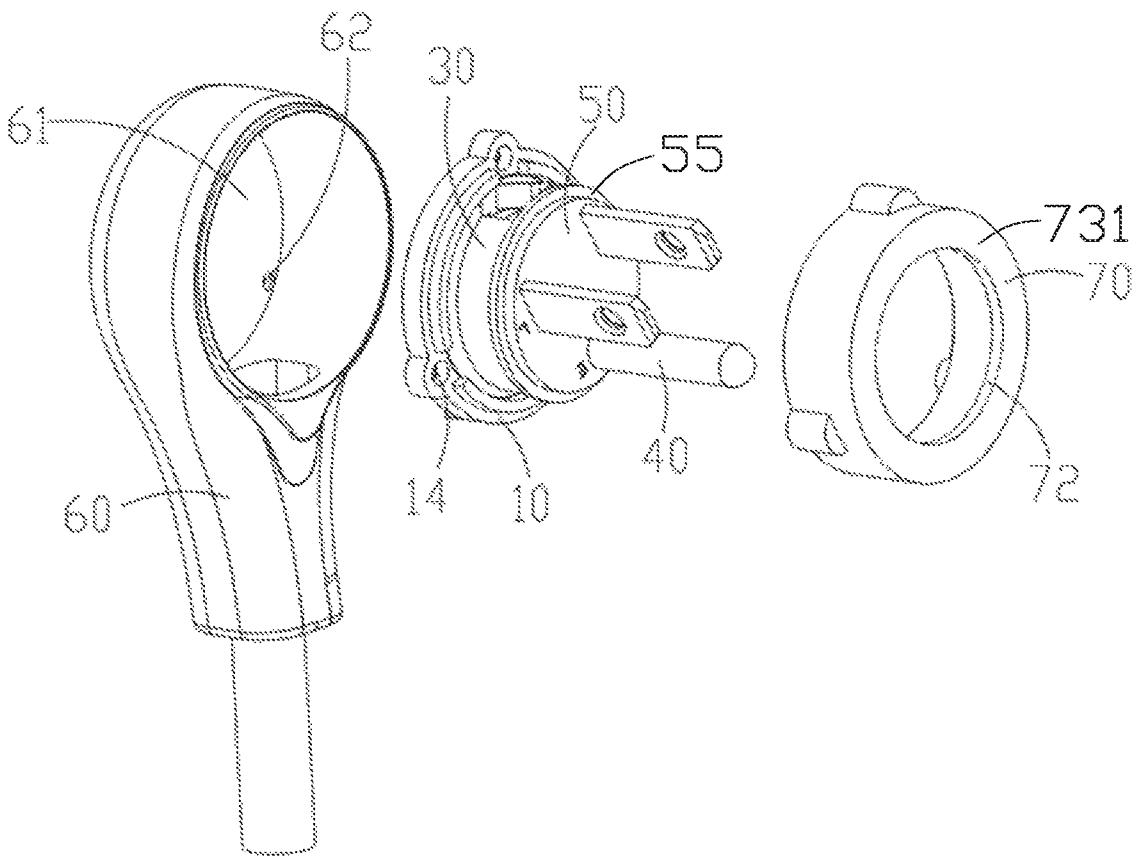
FIG. 2 is an exploded view of the rotatable electrical plug shown in FIG. 1.
Figure 3:
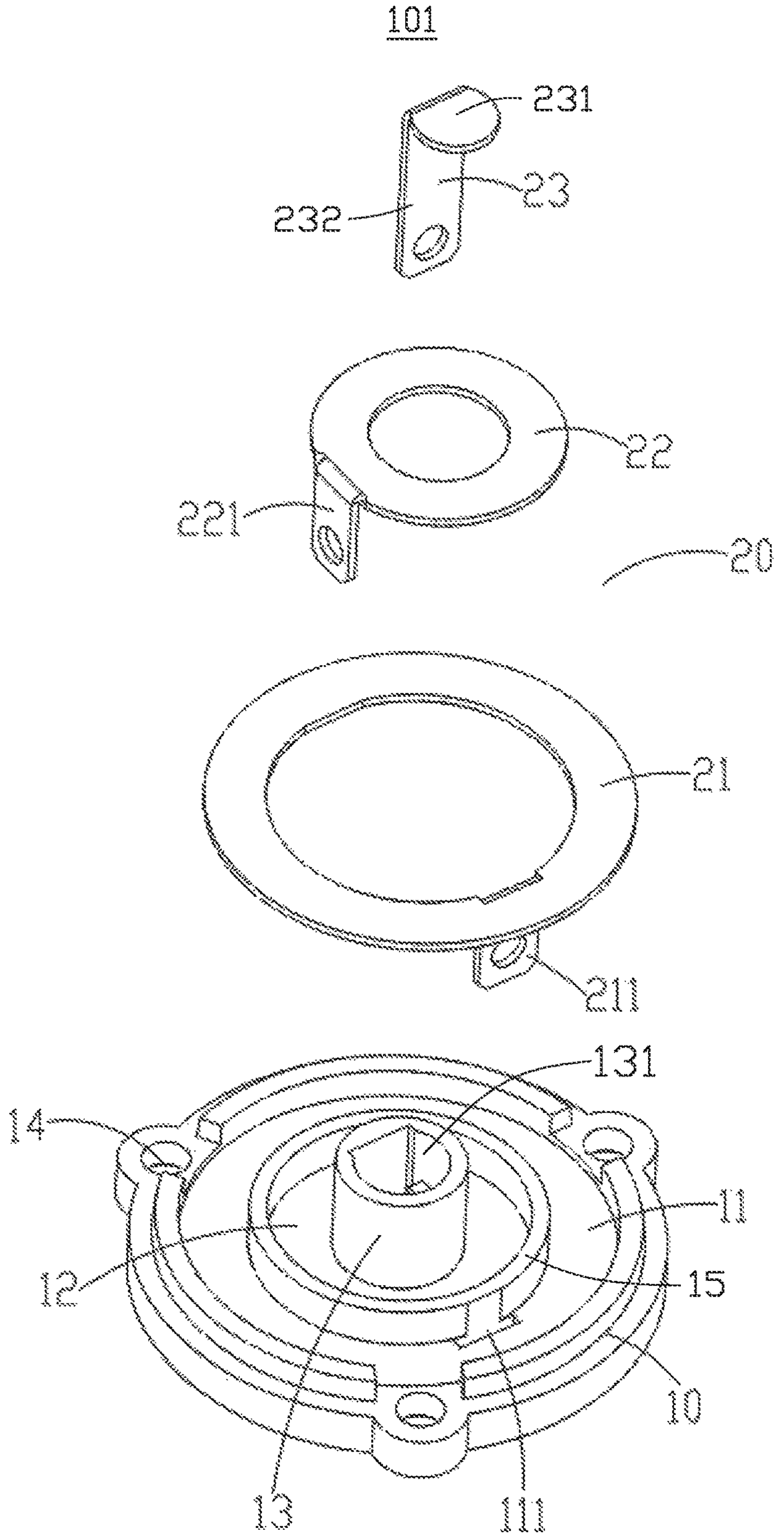
FIG. 3 is an exploded view of a non-rotating assembly of the present disclosure.

Referring to FIGS. 2 and 3, the non-rotating assembly 101 is configured for receiving and being coupled with power lines of the rotatable electrical plug 100, and comprises a substrate 10, and a conductor unit 20 located on the substrate 10.

The substrate 10 comprises a first groove 11, a second groove 12 and a third groove 131. The first groove 11 surrounds the second groove 12, and the second groove 12 surrounds the third groove 131.

In this embodiment, both the first groove 11 and the second groove 12 are circular in shape. A first circle defined by the first groove 11 and a second circled defined by the second groove 12 are concentric. The substrate 10 comprises a cylinder 13, the third groove 131 is defined on the cylinder 13, and located in a center of the circles defined by the first groove 11 and the second groove 12. In other embodiment, the first groove 11, the second groove 12 and the third groove 131 can be for example other ring shapes.

A spacer wall 15 is disposed between the first groove 11 and the second groove 12 and formed by parts of substrate 10.

The conductor unit 20 comprises a first ring-shaped conductor (an example of non-rotating element) 21, a second ring-shaped conductor (an example of non-rotating element) 22, and a non-rotating conductor (an example of non-rotating element) 23. The first ring-shaped conductor 21, the second ring-shaped conductor 22 and the non-rotating conductor 23 are spaced from each other and sequentially arranged on the substrate 10. The first ring-shape conductor 21, the second ring-shaped conductor 22 and the non-rotating conductor 23 are correspondingly arranged to the first groove 11, the second groove and third groove 131 respectively.

The first ring-shaped conductor 21 and the second ring-shaped conductor 22 are located in concentric circles, and a diameter of the first ring-shaped conductor 21 is greater than a diameter of the second ring-shaped conductor 22, that is, the second ring-shaped conductor 22 is located an inner side of the first ring-shaped conductor 21. In this embodiment, the first ring-shaped conductor 21 and the second ring-shaped conductor 22 are coplanar. In addition, the first ring-shaped conductor 21 comprises a first fixing portion 211 configured to fix the first ring-shaped conductor 21 on the substrate 10, the second ring-shaped conductor 22 comprises a second fixing portion 221 configured to fix the second ring-shaped conductor 22 on the substrate 10.

The non-rotating conductor 23 is located on a center of the substrate 10 and surrounded by the first ring-shaped conductor 21 and the second ring-shaped conductor 22. The non-rotating conductor 23 comprises a sheet 231 and a third fixing portion 232 integrated with the sheet 231, the sheet 231 obliquely connects to the third fixing portion 232, and therefore, the sheet 231 is inclined and has a certain degree of elasticity.

In other embodiment, a part of the sheet 231 obliquely connects to the third fixing portion 232, there are no restrictions here.

Figure 8:
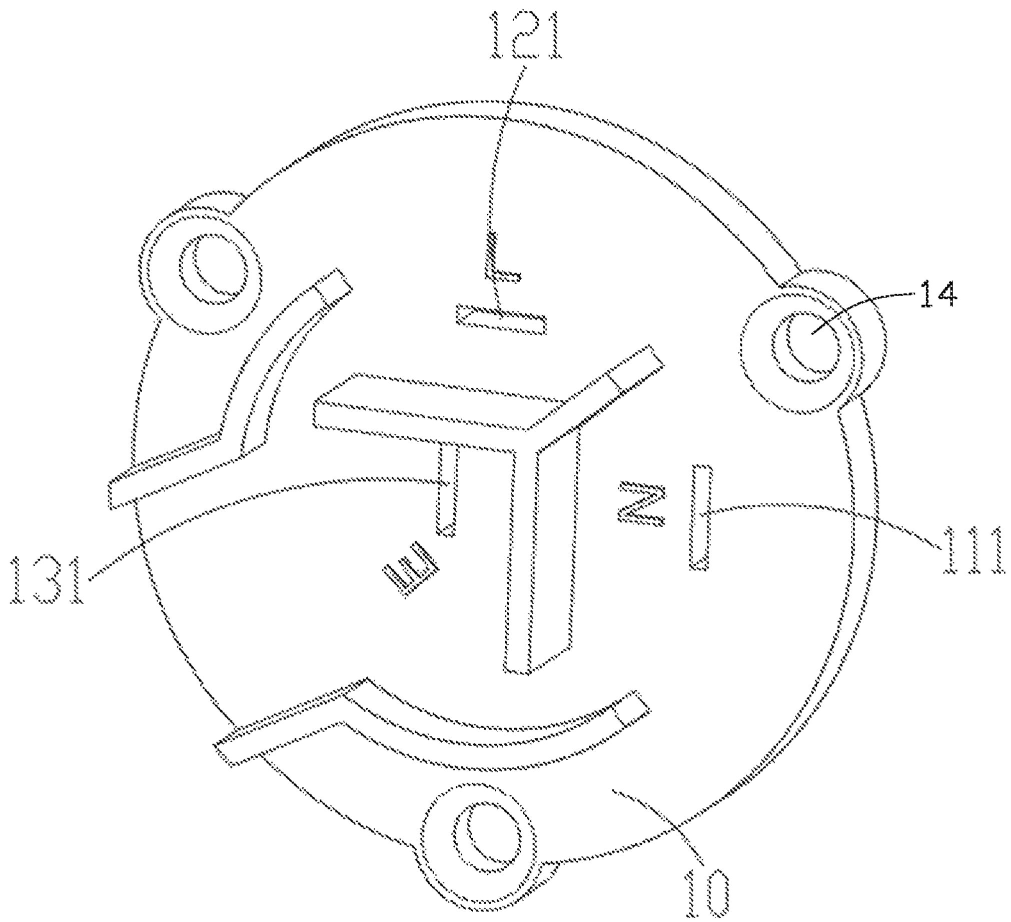
FIG. 8 is a schematic diagram of a substrate of the present disclosure.

The first groove 11 is configured for receiving the first ring-shaped conductor 21, the second groove 12 is configured for receiving the second ring-shaped conductor 22, and the third groove 131 is configured for receiving the third non-rotating conductor 23. Referring to FIGS. 2 and 8, a bottom of the first groove 11 defines a through hole 111, a bottom of the second groove 12 defines a second through hole 121, and a bottom of the third groove 131 defines a third through hole 131. The first fixing portion 211, the second fixing portion 221 and the third fixing portion 232 pass through the thickness of the substrate 10 via the corresponding first through 111, the second through hole 121 and the third through hole 131, and are connected to a corresponding power line.

In this embodiment, a length of the first fixing portion 211 and the second fixing portion 221 is greater than a length of the third fixing portion 232, and a height of the cylinder 13 is greater than a height of the spacer wall 15.

Figure 4:
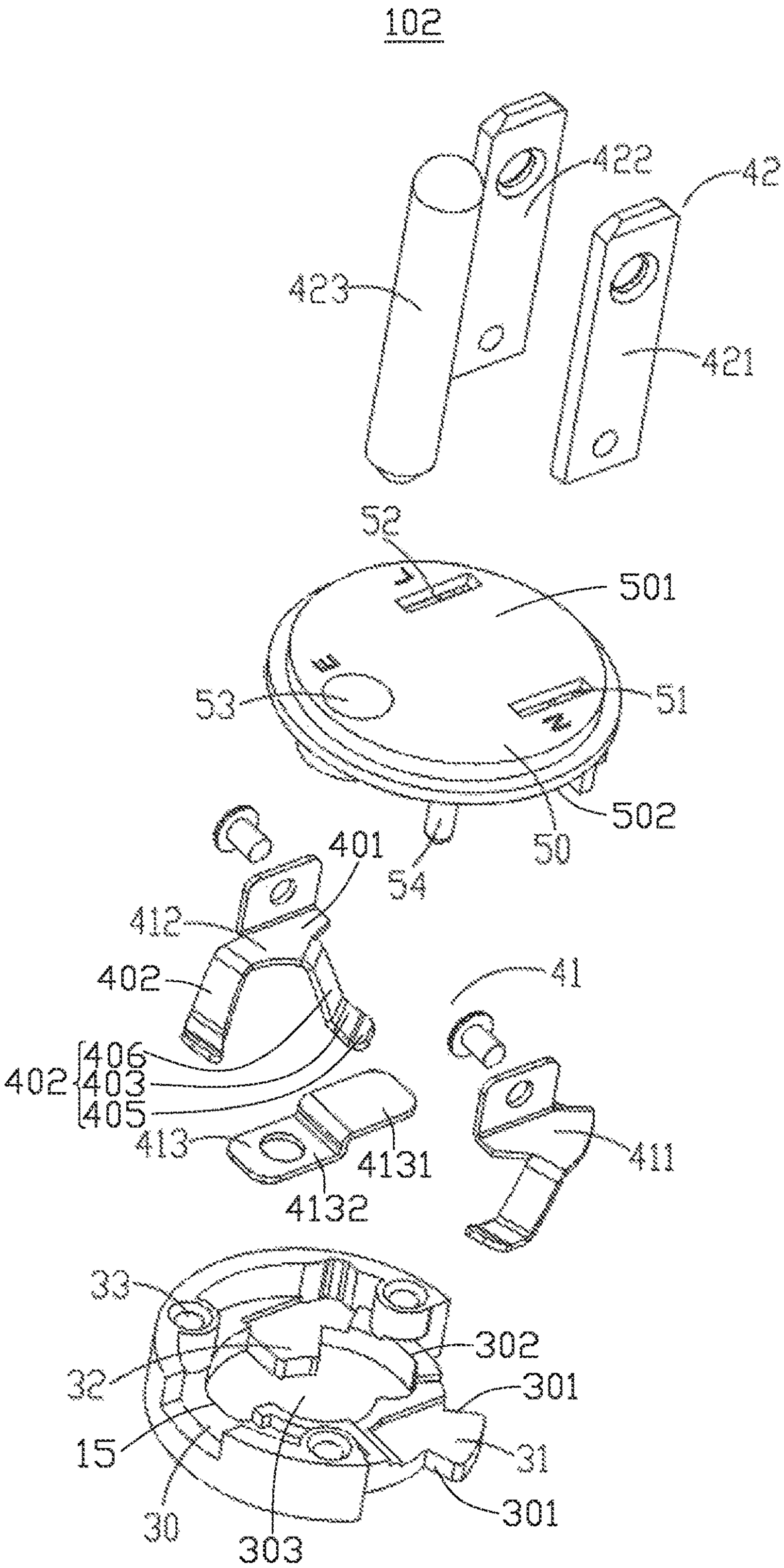
FIG. 4 is a first exploded view of a rotating assembly of the present disclosure.
Figure 5:
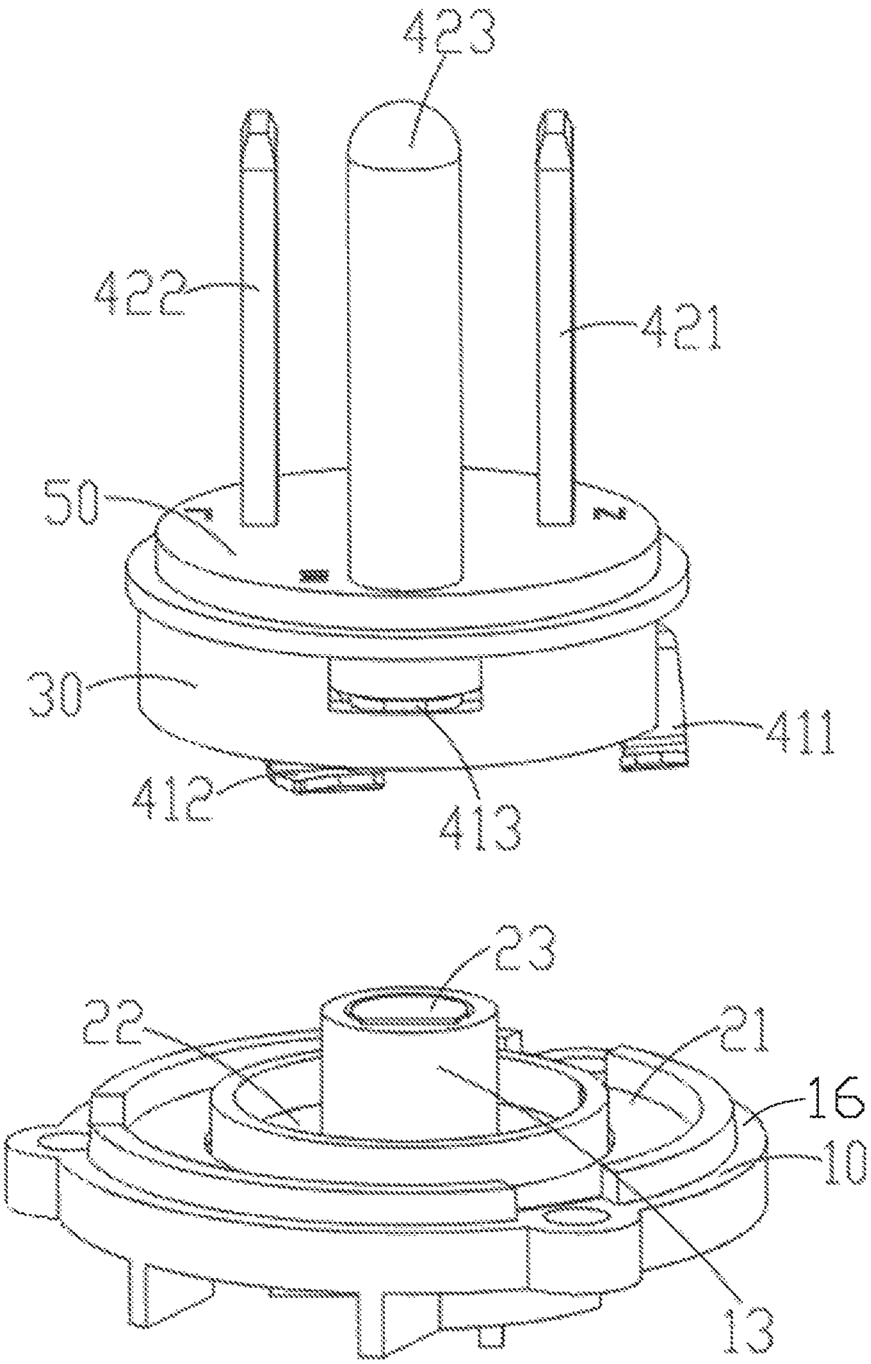
FIG. 5 shows a separate state of the non-rotating assembly and the rotating assembly of the present disclosure.

Referring to FIGS. 2 and 4, the rotating assembly 102 comprises a fastening element 30, a conductive unit 40 and a plate 50. The conductive unit 40 comprises a conductive unit 41 and a terminal unit 42 configured to electrically plug-in a power socket.

The fastening element 30 is configured to fix the conductive unit 41 to the plate 50, the detailed structure will be described later.

The conductive unit 41 comprises a first rotating conductor 411 connected to the first ring-shaped conductor 21, a second rotating conductor 412 connected to the second ring-shaped conductor 22 and a third rotating conductor 413 connected to the non-rotating conductor 23, and each electrode terminal (described later) of the terminal unit 42 is connected to a corresponding one of the first ring-shaped conductor 21, the second ring-shaped conductor 22 and the non-rotating conductor 23 via a corresponding one of the rotating conductors. In this embodiment, the first rotating conductor 411 and the second rotating conductor 412 are made of copper.

Figure 6:
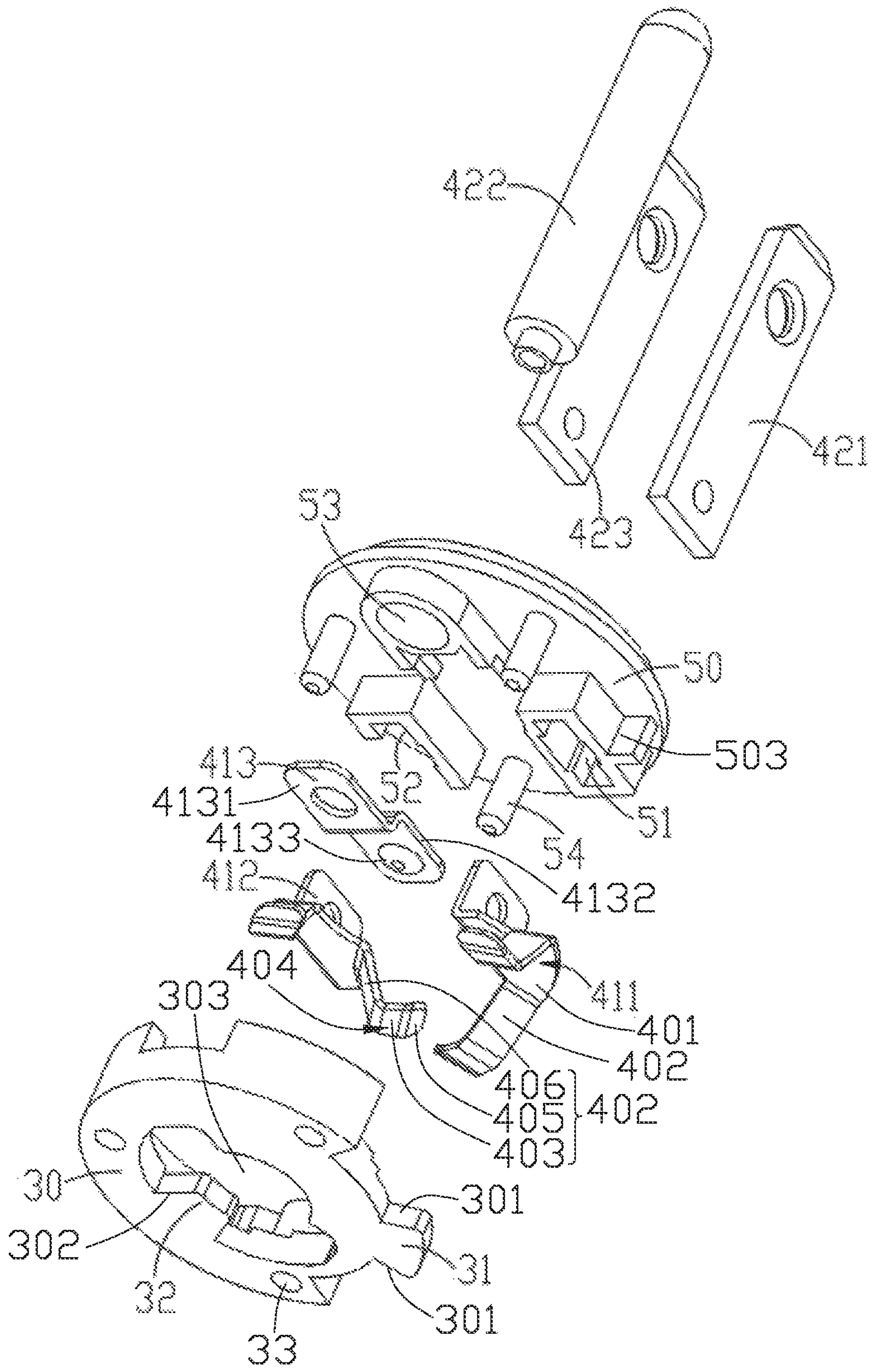
FIG. 6 is a second exploded view of the rotating assembly of the present disclosure.
Figure 7:
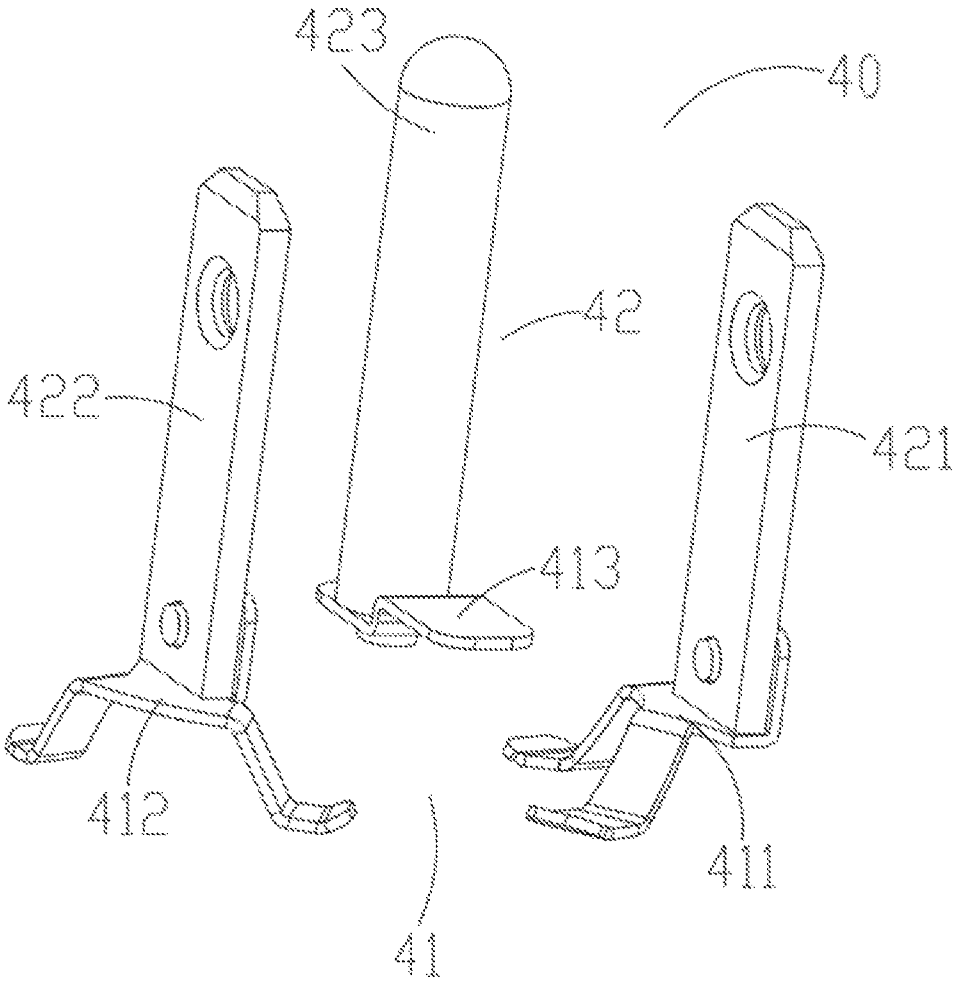
FIG. 7 is a schematic diagram of a conductive unit of the present disclosure.

Referring to FIGS. 4 and 6, at least one of the first rotating conductor 411 and the second rotating conductor 412 comprises a base 401 and two arms 402 extending from the base 401 and extending in two non-parallel directions.

Each arm 402 includes a contacting portion 403 having a contacting surface 404. The contacting surfaces 404 of the two arms 402 contact two different positions of the same ring-shaped conductor, so as to form two electronic contacting points. When one of the contacting portions is damaged caused by prolonged rotational friction, the rotating conduct still normally works due to existing another contacting point. Each of the contacting surface 404 is a flat surface. In the embodiment, an area of the flat surface is 2-5 square millimeters.

Each arm 402 further comprises an extending portion 405 adjacent to a free end of each of the two arms 402, the extending portion 405 connects to the contacting portion 403 and does not contact the corresponding one of the first ring-shaped conductor and the second ring-shaped conductor. Due to having the extending portion 405 that is not in contact with the corresponding one of the first ring-shaped conductor and the second ring-shaped conductor, therefore it can prevent the end of the arms 402 from tilting and deforming.

Each arm 402 further comprises a connecting portion 406 both obliquely connecting with the base 401 and the contacting portion 403, so that the base 401 and the contacting portion 403 are located on different planar surfaces.

In this embodiment, both the first rotating conductor 411 and the second rotating conductor 412 each comprises the base 401 and the two arms 402, the two arms 402 and at least part of the base 401 of the first rotating conductor 411 form a first arc-like structure, the two arms 402 and at least part of the base 401 of the second rotating conductor 412 form a second arc-like structure, and the second arc-like structure is closer to a center of the rotatable electrical plug 100 compared to the first arc-like structure. The base 401 of the first rotating conductor 411 and the base 401 of the second rotating conductor 412 are coplanar. In addition, both the first rotating conductor 411 and the second rotating conductor 412 each is a metal component with elasticity.

A distance between the first rotating conductor 411 and the first ring-shape conductor 21, and a distance between the second rotating conductor 411 and the second ring-shape conductor 22 can be regulated due to its arm structure. That is, the size of the plug can be obtained by regulating these distances.

The third rotating conductor 413 is a slice, the slice comprises a first portion 4131 and a second portion 4132. The first portion 4131 is configured to connect to a third electrode terminal 423 (described later) of the terminal unit 42, and the second portion 4132 is closer to a center of the plate 50 compared to the first portion 4131. The first portion 4131 and the second portion 4132 are located on different planar surfaces. The third rotating conductor 413 further comprises a contact 4133 configured to connect to the non-rotating conductor 23 and arranged on the second portion 4132.

In this embodiment, the terminal unit 42 comprises a first electrode terminal 421, a second electrode terminal 422 and the third electrode terminal 423, the first electrode terminal 421, the second electrode terminal 422 and the third electrode terminal 423 are spaced from each other.

In this embodiment, the first electrode terminal 421, the second electrode terminal 422, and the third electrode terminal 423 are forms a set of pins of a three terminal plug, and the set of pins respectively corresponding to one of the live wire, zero wire, and ground wire.

The plate 50 is configured for fixing the terminal unit 42 and the conductive unit 41, the plate 50 comprises a first surface 501 exposed to an exterior of the rotatable electrical plug 100 and a second surface 502 disposed opposite to the first surface 501, one end of each of the electrode terminals extends through the plate 50, and exposes to the exterior from the second surface 502 of the plate 50, and then couples to a corresponding rotating conductor of the conductive unit 41.

The plate 50 comprises at least one aperture corresponding to the at least one of the electrode terminals, and a protrusion 503 located on the second surface 502 is applied to surround the corresponding aperture, the corresponding electrode terminal extends through the plate 50 via the corresponding aperture and one of the rotating conductors of the conductor unit 41 connected to the corresponding electrode terminal is arranged above the protrusion 503.

In this embodiment, referring to FIG. 6, the plate 50 comprises a first aperture 51 configured to receive first electrode terminal 421, a second aperture 52 configured to receive second electrode terminal 422, and a third aperture 53 configured to receive third electrode terminal 423.

The fastening element 30 is mounted on the second surface 502 of the plate 50, the fastening element 30 comprises notches corresponding to the arms 402 and a spacer formed between two adjacent notches arranged in a circumferential direction, the arms 402 expose outside via the corresponding notch, and the spacer 31 is disposed to sandwich the base 401 with the protrusion 503.

In this embodiment, referring to FIGS. 4 and 6, the fastening element 30 comprises two first notches 301 located an edge of the fastening element 30 and a first spacer 31 located between the two first notches 301, the first spacer 31 engaged on the base 401 of the first rotating conductor 411, and the two arms 402 of the first rotating conductor 411 penetrated through the corresponding first notch 301.

The fastening element 30 further comprises two second notches 302 and a second spacer 32 located between the two second notches 302, the second spacer 31 engaged on the base 401 of the second rotating conductor 412, and the two arms 402 of the second rotating conductor 412 penetrated through the corresponding second notch 302.

In addition, the fastening element 30 further comprises a hole 303 configured to make an allowance of the third rotating conductor 413 passing therethrough. In this embodiment, the hole 303 is in air communication with the two second notches 302. In other embodiments, the hole 303 and the two second notches 302 can also be disconnected, and there is no limitation here.

By setting such a fastening element 30, the first rotating conductor 411 and the second rotating conductor 412 can be stably fixed, effectively preventing the first rotating conductor 411 and the second rotating conductor 412 from shifting and deforming during rotation, further avoiding electrical contact between the first rotating conductor 411 and the second rotating conductor 412, and effectively improving the safety of use.

In this embodiment, a height between the contacting portion 403 and the second surface 502 of the plate 50 is greater than a thickness of the fastening element 30, so that the contacting portion 403 exposes to the exterior via the corresponding notch and connects to the corresponding ring-shaped conductor.

The rotating assembly 102 further comprises a fixing structure configured to fix the fastening element 30 to the plate 50. In this embodiment, the fixing structure comprises a plurality of fixing holes 33 and a plurality of columns 54, the columns 54 are arranged and formed by parts of the plate 50, and the fixing holes 33 are defined and formed by parts of the fastening element 30, so that insert the columns 54 into the corresponding fixing hole 33 to secure the plate 50 and the fastening element 30. In other embodiments, other fixing structures can also be used, without limitation here.

Figure 9:
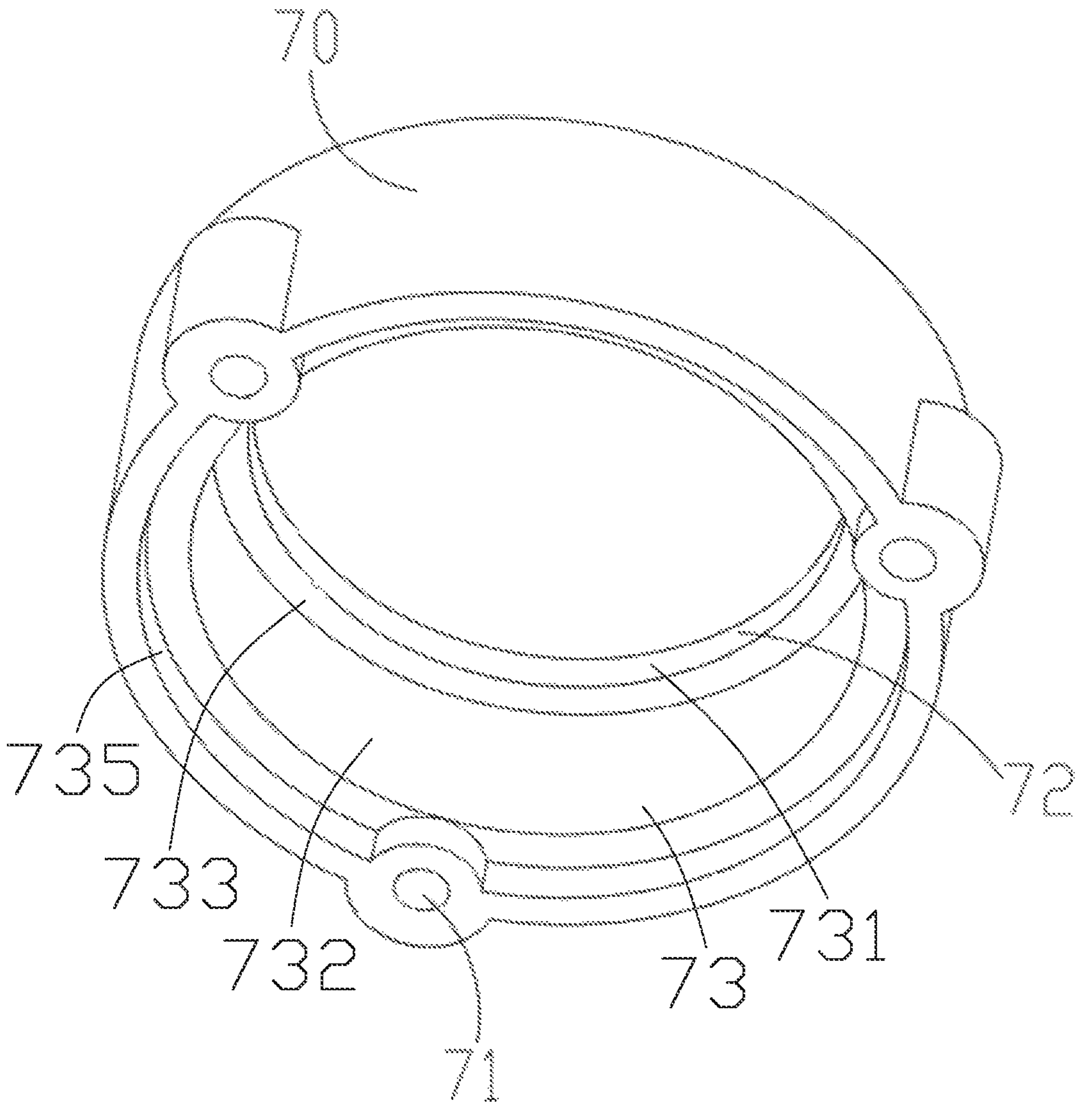
FIG. 9 is a schematic diagram of a frame of the present disclosure.
Figure 10:
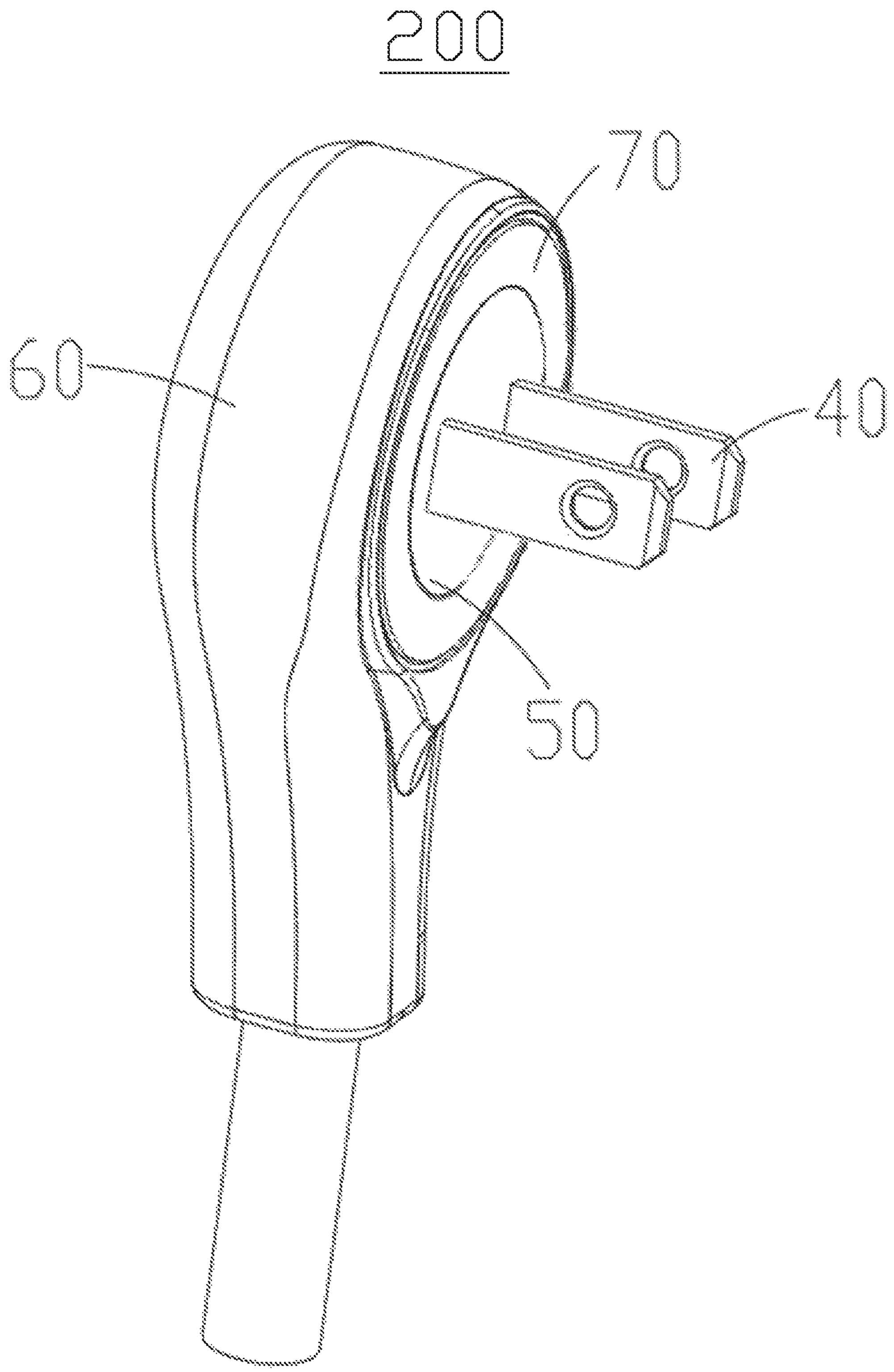
FIG. 10 is a schematic diagram of a second embodiment of a three-dimensional structure of a rotatable electrical plug according to the present disclosure.
Figure 11:
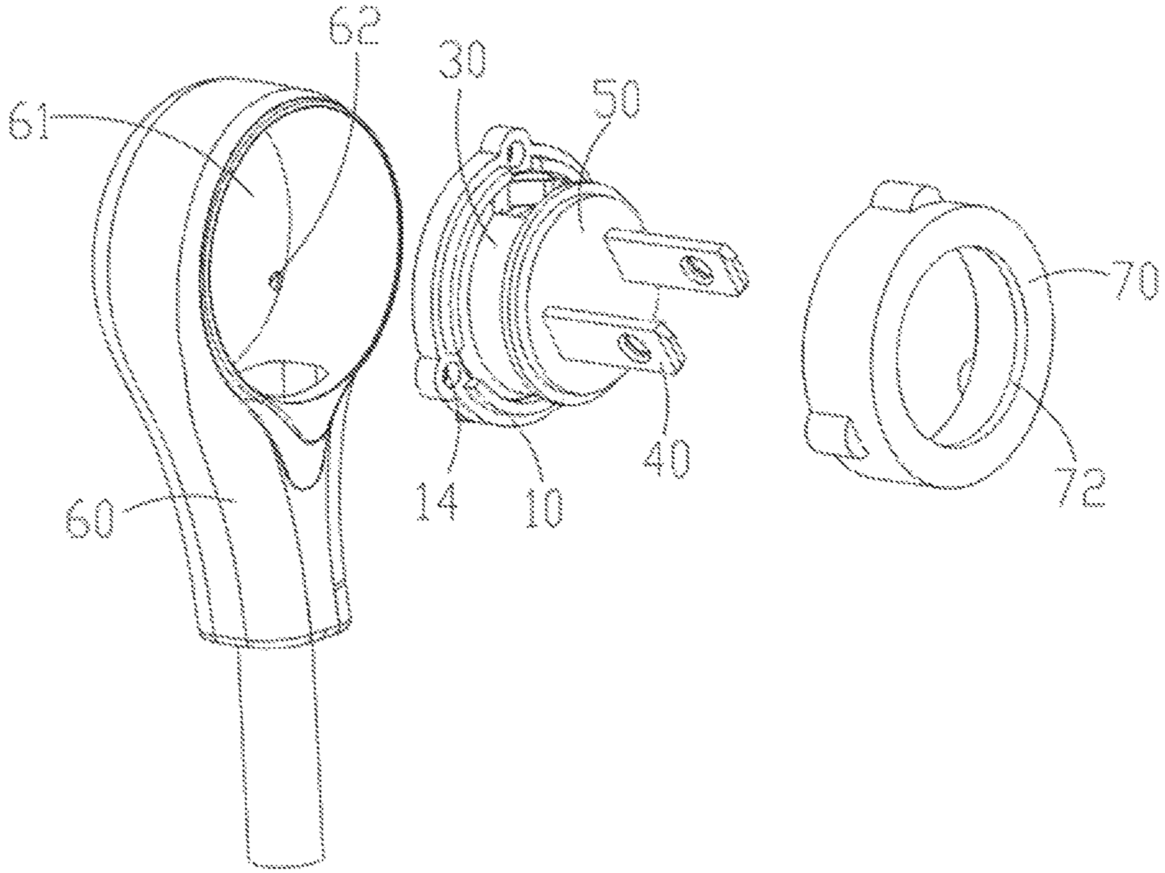
FIG. 11 is an exploded view of the rotatable electrical plug in the rotatable electrical plug shown in FIG. 10.
Figure 12:
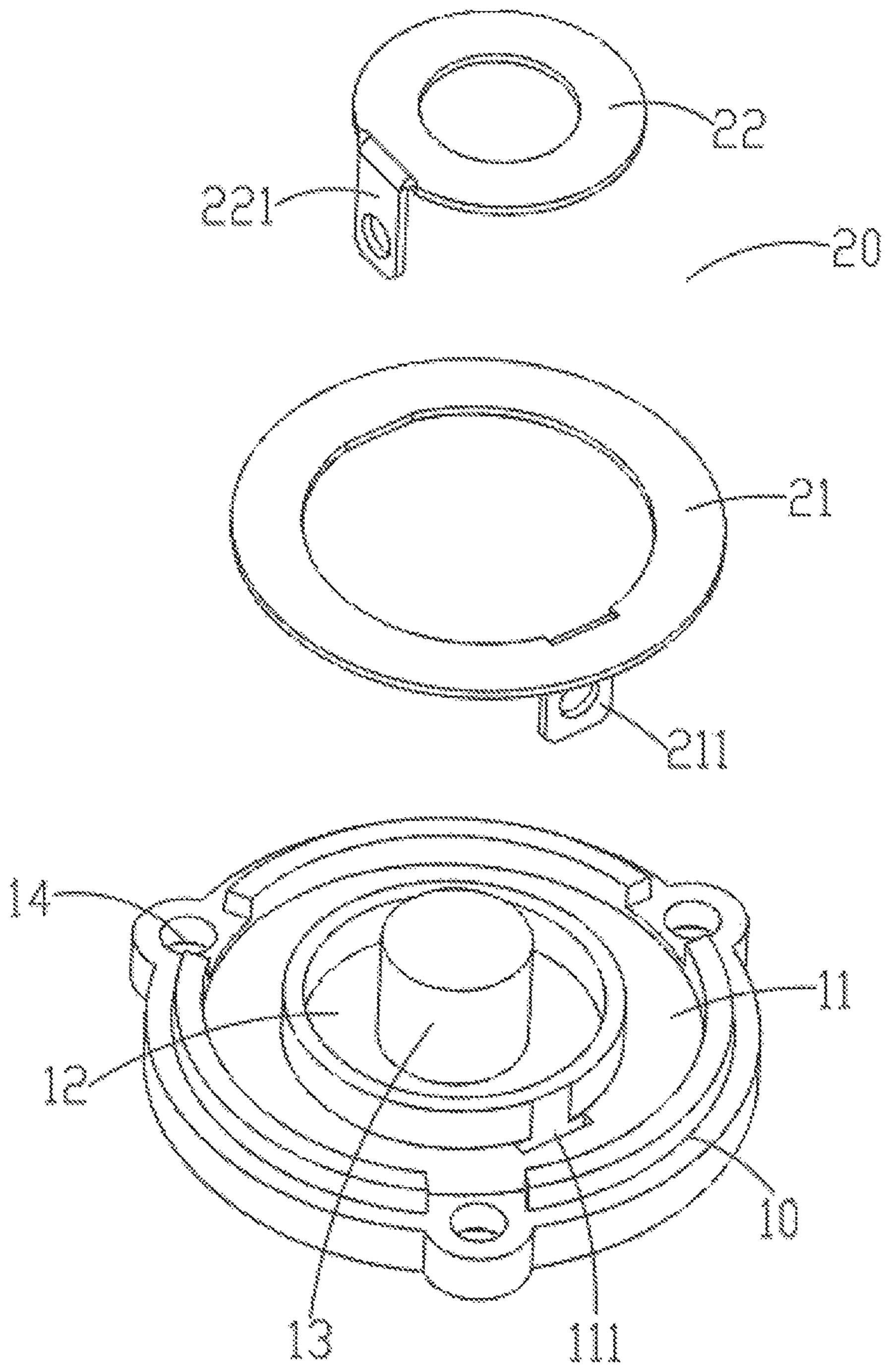
FIG. 12 is an exploded view of the non-rotating assembly in the rotatable electrical plug shown in FIG. 10.
Figure 13:
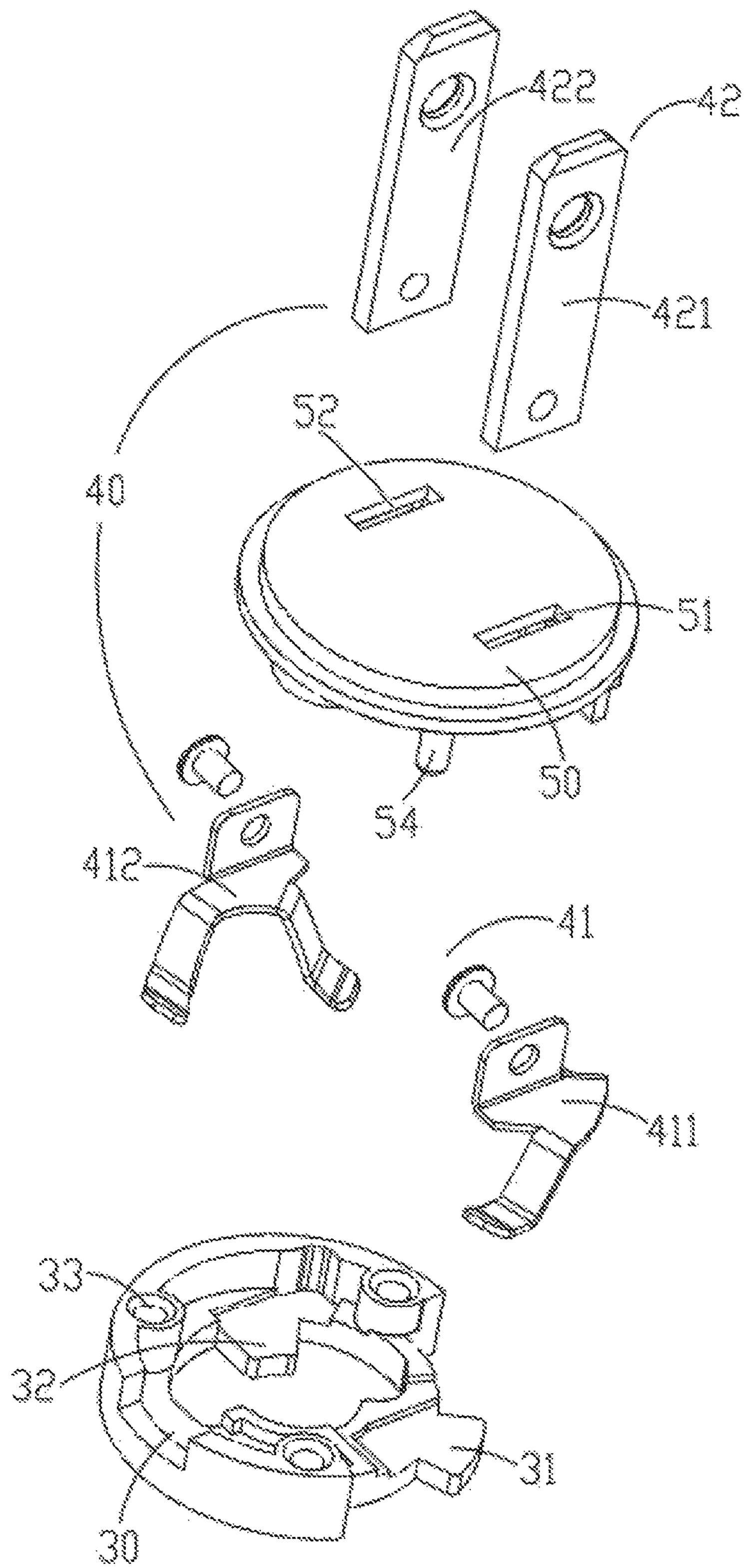
FIG. 13 is an exploded view of the rotating assembly of the second embodiment of the rotatable electrical plug in FIG. 10.

Referring to FIGS. 2 and 9, the frame 70 configured to fasten the non-rotating assembly 101 and pivotally fixed the rotating assembly 102 is shown. The frame 70 comprises an opening 72. The frame 70 comprises an inwall 73, which comprises a first end 731 and a second end 732. The first end 731 is equipped with a first convex portion 733, and a side surface of the plate 50 is equipped with a second convex portion 55.

In the assembly state, the rotating assembly 102 passes through the opening 72, and the second convex portion 55 is coupled with the first convex portion 733. The second end 732 defines a concave portion 735, the edge of the substrate 10 comprises a clamping portion 16, configured to be fixed in the concave portion 735. A bottom surface near the second end 732 of the frame 70 defines a plurality of fixed grooves 71, and the edge of the substrate 10 defines a plurality of first fixed holes 14.

Referring to FIG. 2, the housing 60 comprises a cavity 61 and a plurality of second fixed holes 62. The cavity 61 is configured to receive the non-rotating assembly 101, the rotating assembly 102, the conductive unit 41 and the frame 70.

In the assembly, the rotating assembly 102 engages on the first end 731 of the frame 70, and the non-rotating assembly 101 covers to the second end 732 of the frame 70, then placing the rotating assembly 102, the non-rotating assembly 101 and the frame 70 into the cavity 61 of the housing 60. Then, by threading several screws through the second fixed holes 62, the first fixed holes 14 and the fixed grooves 71, the rotating assembly 102 and the non-rotating assembly 101, the frame 70 and the housing 60 are connected and fixed, the electrode terminals are exposed to the frame 70 to insert into a socket.

Compared to the prior art, the rotatable electrical plug 100 of the present disclosure can be connected by setting the rotating conductors on the plate 50, the first ring-shaped conductor 21, the second ring-shaped conductor 22, and the non-rotating conductor 23 on the substrate 10, and connecting various components through the housing 60, the fastening element 30, and several screws, making the rotating assembly 102 able to rotate relative to the non-rotating assembly 101, so that it is convenient to use, the structure of the rotatable electrical plug 100 is simple, and the rotatable electrical plug 100 has good conductivity and durability.

Second Embodiment

FIGS. 10-13 illustrate a second embodiment of rotatable electrical plug 200. The design of the rotatable electrical plug 200 is very similar to the design of the rotatable electrical plug 100, the same reference numbers which were used in FIGS. 1-9 are used to identify like components in FIGS. 10-13 and only a brief description of the differences between the two rotatable electrical plugs is provided. The main difference is that the third rotating conductor 413, the non-rotating conductor 23 and the third electrode terminal 423 are not used in the rotatable electrical plug 200. In addition, the third groove 131 is not formed on the substrate 10, that is the cylinder 13 is formed on the center of the substrate 10.

Based on the above composition, it can achieve the same effect as the first embodiment mentioned above.

As can be appreciated from the above description, the design of the present rotatable electrical plug makes it possible to produce both two-prong and three-prong plugs without any substantial design changes. As a result, it is more economical to produce both two-prong and three-prong versions of the rotatable electrical plug.

What is claimed is:

1. A rotatable electrical plug comprising:

a non-rotating assembly configured for receiving and being coupled with power lines of the rotatable electrical plug, the non-rotating assembly comprising a substrate, a first ring-shaped conductor and a second ring-shaped conductor spaced from the first ring-shaped conductor, wherein the first ring-shaped conductor and the second ring-shaped conductor are located in concentric circles; and a rotating assembly being rotatable relative to the non-rotating assembly, the rotating assembly comprising at least two electrode terminals configured to electrically plug-in a power socket; a first rotating conductor and a second rotating conductor connected to the first ring-shaped conductor and the second ring-shaped conductor respectively, at least one of the first rotating conductor and the second rotating conductor comprising a base and two arms extending from the base and extending in two non-parallel directions, each of the two arms including a contacting portion, wherein the contacting portions of the two arms contact two different positions of a same ring-shaped conductor of the first and the second ring-shaped conductors, wherein each of the at least two electrode terminals is connected to a corresponding one of the first and the second ring-shaped conductors via a corresponding one of the first and the second rotating conductors, wherein the rotating assembly further comprises a plate and a fastening element mounted on the plate, the fastening element comprises notches corresponding to the arms and a spacer formed between two adjacent notches arranged in a circumferential direction, the arms is exposed to the exterior via the corresponding notch, and the spacer is disposed on the base.

2. The rotatable electrical plug according to claim 1, wherein each of the two arms further comprises an extending portion adjacent to a free end of each of the two arms, the extending portion connects to the contacting portion and does not contact the corresponding one of the first and the second ring-shaped conductors.

3. The rotatable electrical plug according to claim 1, wherein each of the two arms further comprises a connecting portion obliquely connecting the base and the contacting portion, so that the base and the contacting portion are located on different planar surfaces.

4. The rotatable electrical plug according to claim 1, wherein the first rotating conductor and the second rotating conductor each is a metal component with elasticity.

5. The rotatable electrical plug according to claim 1, wherein each of the first and the second rotating conductors further comprises a mounting portion configured to connect to the corresponding one of the first and the second electrode terminals.

6. The rotatable electrical plug according to claim 1, wherein the rotating assembly is rotatable 360 degrees relative to the non-rotating assembly.

7. The rotatable electrical plug according to claim 1, wherein each of the contacting portions comprises a contacting surface which is a flat surface.

8. The rotatable electrical plug according to claim 7, wherein an area of the contacting surface is 2 to 5 square millimeters.

9. The rotatable electrical plug according to claim 1, wherein the first rotating conductor and the second rotating conductor each comprises the base and the two arms, the two arms and at least part of the base of the first rotating conductor form a first arc-like structure, the two arms and at least part of the base of the second rotating conductor form a second arc-like structure, the second arc-like structure is closer to a center of the rotatable electrical plug compared to the first arc-like structure.

10. The rotatable electrical plug according to claim 9, wherein the base of the first rotating conductor and the base of the second rotating conductor are coplanar.

11. The rotatable electrical plug according to claim 1, wherein the plate comprises a first surface exposed to an exterior of the rotatable electrical plug and a second surface disposed opposite to the first surface, one end of each of the at least two electrode terminals extends through the plate, and exposes to the exterior from the second surface of the plate, and then couples to the corresponding one of the first rotating conductor and the second rotating conductor.

12. The rotatable electrical plug according to claim 11, wherein the plate comprises at least one aperture corresponding to the at least one of the electrode terminals, and a protrusion located on the second surface is applied to surround the corresponding aperture, the corresponding electrode terminal extends through the plate via the corresponding aperture and one of the first rotating conductor and the second rotating conductor connected to the corresponding electrode terminal is arranged above the protrusion.

13. The rotatable electrical plug according to claim 12, wherein a height between the contacting portion and the second surface of the plate is greater than a thickness of the fastening element.

14. A rotatable electrical plug comprising:

a non-rotating assembly configured for receiving and being coupled with power lines of the rotatable electrical plug, the non-rotating assembly comprising a substrate, and at least one non-rotating element; and a rotating assembly being rotatable relative to the non-rotating assembly, the rotating assembly comprising at least two electrode terminals configured to electrically plug-in a power socket; and at least one rotating conductor connected to the at least one non-rotating element, the at least one rotating conductor comprising a base and two arms obliquely extending from the base and extending in two non-parallel directions, wherein at least one electrode terminal is connected to the at least one ring-shaped conductor via the at least one rotating conductor, wherein the rotating assembly further comprises a plate and a fastening element mounted on the plate, and the at least one rotating conductor is mounted on a surface of the plate facing the rotating assembly so that at least part of the at least one rotating conductor is sandwiched between the plate and the fastening element, and wherein the fastening element comprises notches corresponding to the arms and a spacer formed between two adjacent notches arranged in a circumferential direction, the arms is exposed to the exterior via the corresponding notch, and the base is sandwiched between the plate and the spacer.

* * * * *